United States Patent
Chiu

(12) United States Patent (10) Patent No.: US 6,556,363 B2
Chiu (45) Date of Patent: Apr. 29, 2003

(54) LENS MODULE

(76) Inventor: Wen-Wen Chiu, No. 15, Alley 16, Lane 576, Sec. 1, Kuang Fu Rd., Tung Zone, Hsin Chu City (TW)

( * ) Notice: Subject to any disclaimer, the term of this patent is extended or adjusted under 35 U.S.C. 154(b) by 7 days.

(21) Appl. No.: 09/973,016

(22) Filed: Oct. 10, 2001

(65) Prior Publication Data

US 2003/0011904 A1 Jan. 16, 2003

(51) Int. Cl.$^7$ .................................................. G02B 7/02
(52) U.S. Cl. ....................................... 359/817; 359/823
(58) Field of Search .............................. 359/642, 811, 359/817, 823

(56) References Cited

U.S. PATENT DOCUMENTS

2002/0030150 A1 * 3/2002 Landolt ................... 250/208.1

* cited by examiner

*Primary Examiner*—Scott J. Sugarman
(74) *Attorney, Agent, or Firm*—Browdy and Neimark, P.L.L.C.

(57) ABSTRACT

A lens module is fixed on a board body which is provided thereon with an imaging chip. The lens module comprises a seat body in which at least one lens is fixed for passage of rays of light from the outside of the seat body so as to form an image on the chip. An expandable tube is sandwiched between the seat body and the board body and is provided with a serpentine segment. A closed passage is formed between the lens and the chip. The expandable tube is provided thereon with a fixation member for limiting deformation of the serpentine segment of the expandable tube.

8 Claims, 4 Drawing Sheets

LENS MODULE

FIELD OF THE INVENTION

The present invention relates generally to a lens, and more particularly to a lens module mounted on a circuit board which is provided with a chip for imaging.

BACKGROUND OF THE INVENTION

As shown in FIG. 1, a lens module 1 of the prior art is mounted on a circuit board 3 which is provided thereon with an electrically-connected chip package 5. The chip package 5 comprises a chip 5a, a chip carrier 5b, and a transparent glass 5c. The chip 5a is disposed in a receiving cell of the chip carrier 5b such that the chip 5a is shielded by the glass 5c. The lens module 1 comprises a seat body 1a, which is fixed on the circuit board 3 by a plurality of screws 1b. The seat body 1a has a threaded hole 1c corresponding in location to the chip 5a. The threaded hole 1c is provided therein with a cylindrical body 1d in which a plurality of lenses 1e are fixed. The image of an object located in the outside of the seat body 1a is formed on the chip 5a via the lenses 1e. The focus between the lens 1e and the chip 5a is adjusted by setting the depth of the cylindrical body 1d in the threaded hole 1c. Such a prior art focus adjustment structure as described is rather inconvenient, complicated in construction, and not cost-effective.

As shown in FIG. 2, another prior art lens module 2 is mounted on a circuit board 4 which is provided thereon with a chip 6 electrically connected therewith. The lens module 2 comprises a seat body 2a which is fastened with the circuit board 4 by a plurality of screws 2b. The seat body 2a has a through hole 2c corresponding to the chip 6. A plurality of lenses 2d are fixed in the through hole 2c. An elastomer 8 is sandwished between the circuit board 4 and the seat body 2a such that the upper end of the elastomer 8 is coupled with the seat body 2a so as to shield the fringe of the chip 6. The elastomer 8 has an elastically expandable pleated portion 8a, which can be caused by an external force to change its height. As a result, the focus adjustment is attained in conjunction with a plurality of screws 2b. In spite of the structural simplicity of the lens module 2, the effect of the components used to adjust or fix the distance between the lens 2d and the chip 6 is by no means simplified or enhanced. The focus adjustment is achieved by adjusting respectively the four screws 2b. In other words, these two prior art lens modules 1 and 2 share a common deficiency.

SUMMARY OF THE INVENTION

The primary objective of the present invention is to provide a lens module which is capable of an easy adjustment and fixation of focus between lens and chip.

The lens module of the present invention is mounted on a board body which is provided thereon with an image-forming chip. The lens module comprises a seat body in which at least one lens is fixed for use in enabling an image outside the seat body to impress on the chip. The seat body and the board body are provided therebetween with an expandable tube having a serpentine segment, thereby forming a closed passage between the lens and the chip. The expandable tube is provided with a fixation member serving to limit deformation of the serpentine segment of the expandable tube.

The features, functions and advantages of the present invention will be more readily understood upon a thoughtful deliberation of the following detailed description of the preferred embodiment of the present invention with reference to the accompanying drawings.

DETAILED DESCRIPTION OF THE INVENTION

Figure 1:
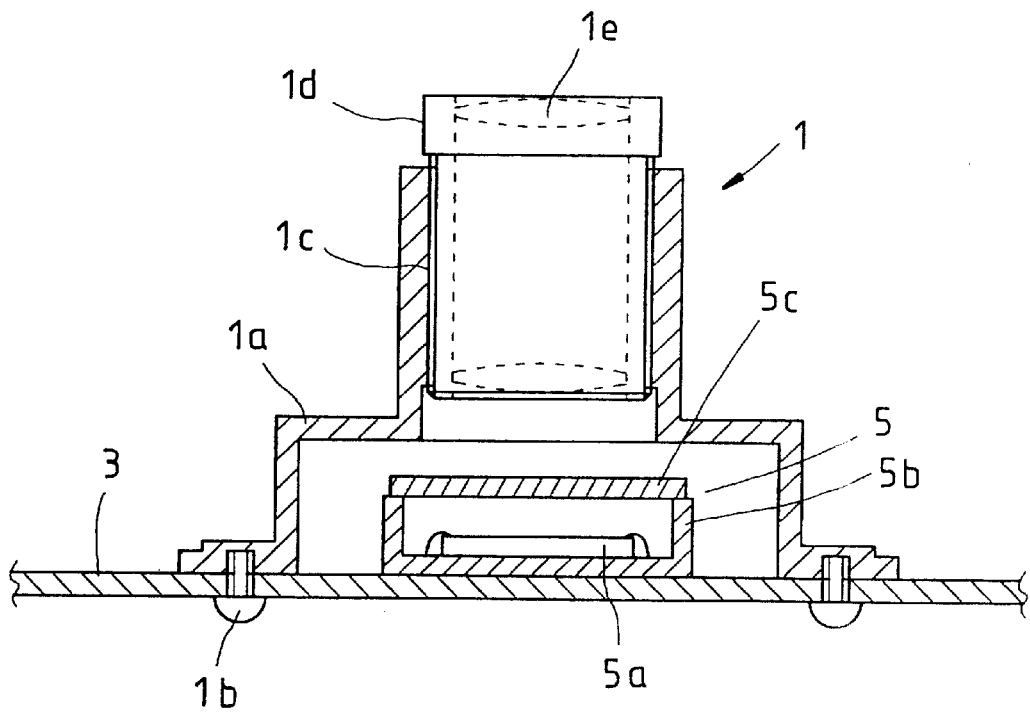
FIG. 1 shows a schematic view of a prior art lens module in use.
Figure 2:
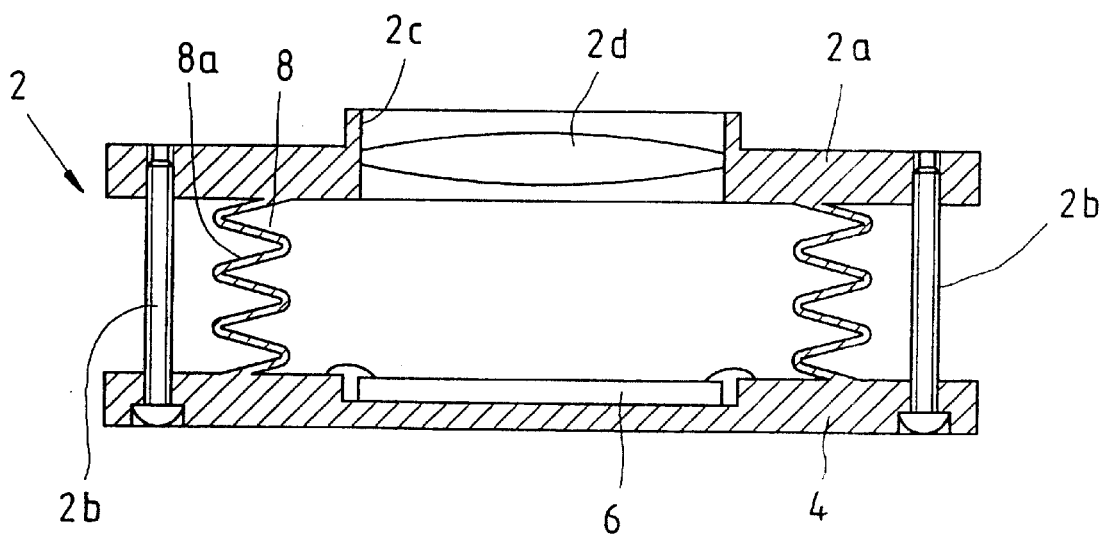
FIG. 2 shows a schematic view of another prior art lens module in use.
Figure 3:
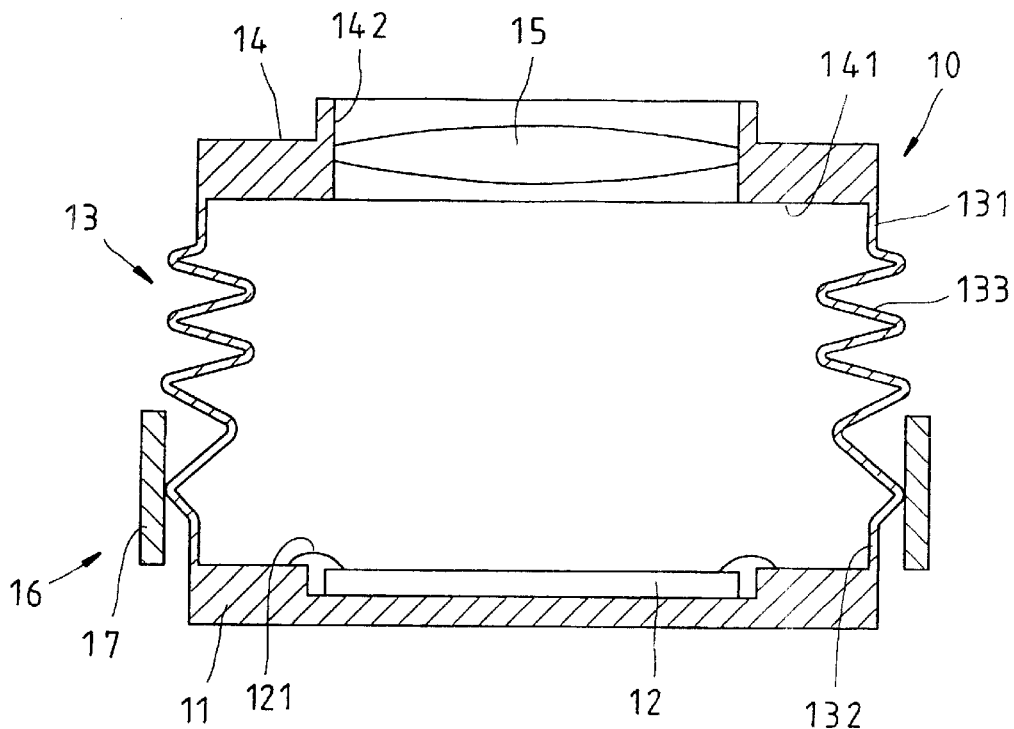
FIG. 3 shows a sectional view of a first preferred embodiment of the present invention.
Figure 4:
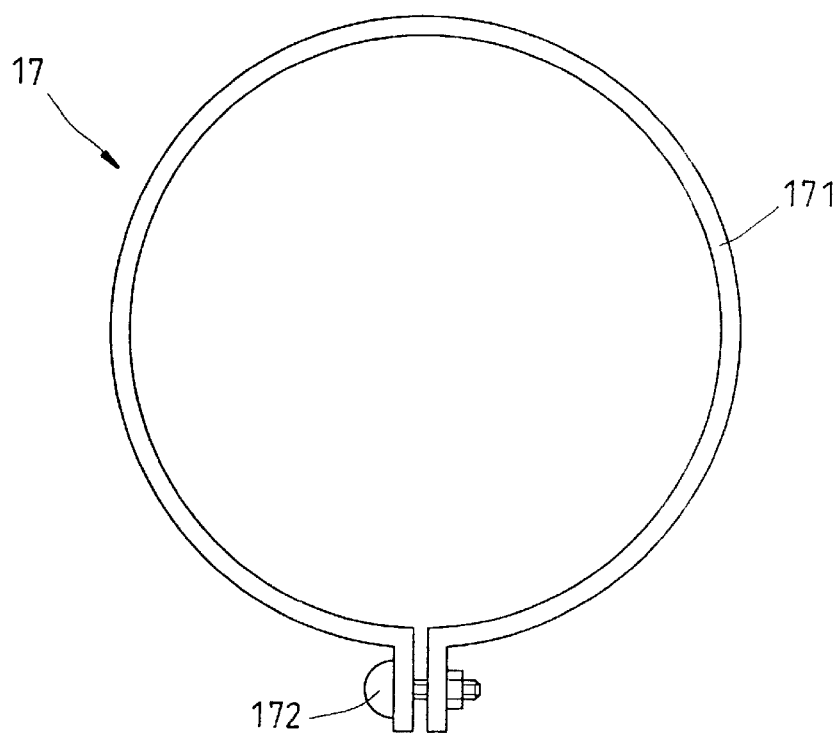
FIG. 4 shows a partial top view of the first preferred embodiment of the present invention.

As shown in FIGS. 3 and 4, a lens module 10 of the first preferred embodiment of the present invention is mounted on a circuit board 11 which is provided thereon with an image-forming chip 12.

The circuit board 11 is made of a plastic, reinforced plastic, glass fiber, or ceramic material.

The image-forming chip 12 is directly fixed on the circuit board 11 by means of an adhesive material, such as epoxy resin, silicone resin, adhesive tape, etc. Besides, the chip 12 is electrically connected with the circuit board 11 by a metal wire 121 in conjunction with the wire bounding technique. The chip 12 may be electrically connected with the circuit board 11 by the flip chip technique.

The lens module 10 comprises an expandable tube 13, a seat body 14, a lens 15, and a fixation member 16.

The expandable tube 13 is made of a plastic, rubber, or silicone rubber material. The expandable tube 13 has a predetermined strength coefficient. The expandable tube 13 is formed of an upper segment 131, a lower segment 132, and a serpentine segment 133. The lower segment 132 is coupled with the circuit board 11 such that it shields the fringe of the chip 12. The serpentine segment 133 can be caused by an external force to deform such that the serpentine segment 133 recovers its original form upon being relieved of the external force exerting thereon.

The seat body 14 has a bottom 141 and a through hole 142. The bottom 141 is coupled with the upper segment 131 of the expandable tube 13, thereby enabling the portion between the upper segment 131 and the lower segment 132 of the expandable tube 13 to form a closed passage. The chip is located in the closed passage. The through hole 142 is corresponding in location to the chip 12 and is located in the seat body 14.

The lens 15 is fixed in the through hole 142 of the seat body 14 for passage of rays of light from the outside of the seat body 14 so as to form an image on the chip 12.

The fixation member 16 is attached to the serpentine segment 133 of the expandable tube 13 for limiting the deformation of the serpentine segment 133. The fixation member 16 of the present invention is a lashing ring 17 with an adjustable inner diameter, as shown in FIG. 4. The lashing ring 17 has a press portion 171 and a lock portion 172 for locking two free ends of the press portion 171. The lashing ring 17 is fitted over the serpentine segment 133 for forcing the serpentine segment 133 to deform to increase the height of the serpentine segment 133. As the lashing ring 17 is loosened, the serpentine segment 133 regains its original form. The focus between the lens 15 and the chip 12 is adjusted by adjusting the height of the serpentine segment 133. The focus is fixed as soon as the inner diameter of the lashing ring 17 is fixed. It is therefore readily apparent that the structure of the present invention is simplified and cost-effective as compared with the prior art structures calling for the use of the threaded hole and the screws in the focus adjustment.

Figure 5:
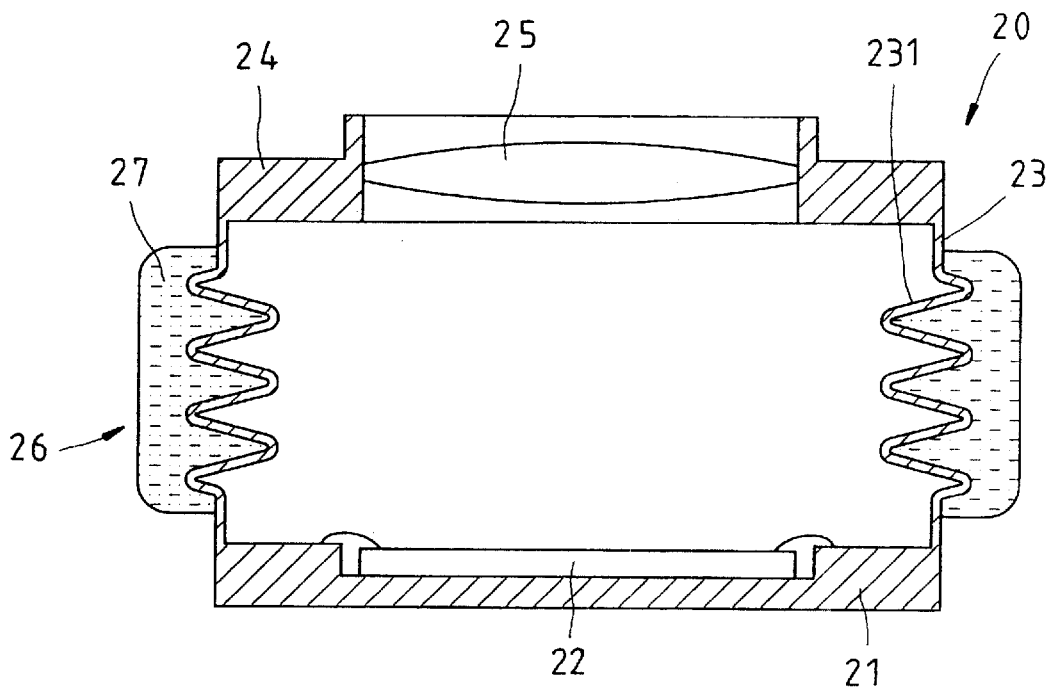
FIG. 5 shows a sectional view of a second preferred embodiment of the present invention.

As shown in FIG. 5, a lens module 20 of the second preferred embodiment of the present invention is mounted on a circuit board 21 which is provided thereon with an imaging chip 22. The lens module 20 comprises an expandable tube 23, a seat body 24, a lens 25, and a fixation member 26. The difference between the first and the second preferred embodiment of the present invention is described hereinafter.

The fixation member 25 is a closed plastic body 27 which is made of a thermosetting moldable material. The serpentine segment 231 of the expandable tube 23 is first exerted on by an external force for a precision adjustment in height of the serpentine segment 231, thereby setting the focus between the lens 25 and the chip 22. Thereafter, the closed plastic body 27 is fitted over the serpentine segment 231 without affecting the height of the serpentine segment 231. Upon completion of solidification of the closed plastic body 27, the form of the serpentine segment 231 is fixed. As a result, the focus between the chip 22 and the lens 25 is fixed accordingly.

Figure 6:
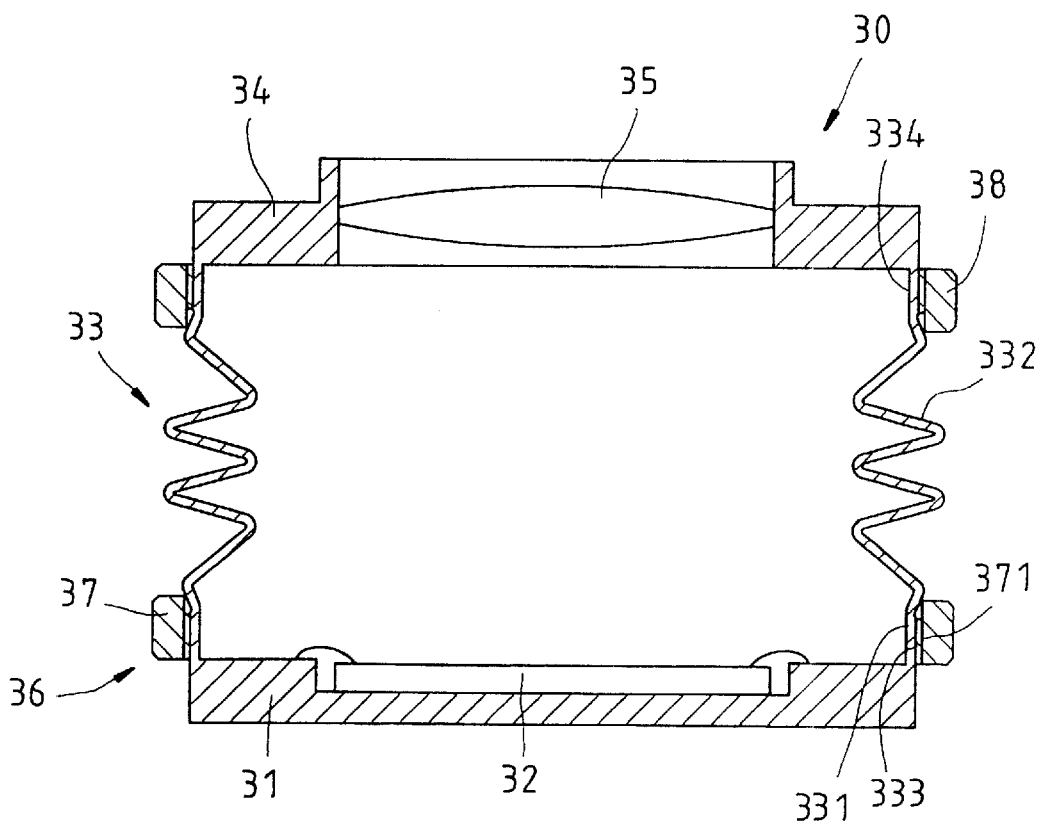
FIG. 6 shows a sectional view of a third preferred embodiment of the present invention.

A shown in FIG. 6, a lens module 30 of the third preferred embodiment of the present invention is mounted on a circuit board 31 which is provided thereon with an imaging chip 32. The lens module 30 comprises an expandable tube 33, a seat body 34, a lens 35, and a fixation member 36.

The difference between the third and the preceding embodiments is described hereinafter.

The expandable tube 33 is provided in the lower segment 331 with an outer threaded segment 333 contiguous to the serpentine segment 332.

The fixation member 36 is a nut 37 having an inner threaded segment 371 which is engaged with the outer threaded segment 333 of the expandable tube 33. By turning the nut 37 to move along the expandable tube 33, the serpentine segment 332 is forced to deform, thereby causing the lower segment 331 to deform accordingly to result in an increase in height of the serpentine segment 332. As a result, the focus between the lens 35 and the chip 32 is adjusted.

The expandable tube 33 is further provided with a nut 38 which is located in the upper segment 334 and is contiguous to the serpentine segment 332. The addition of the nut 38 serves to facilitate the focus adjustment.

Figure 7:
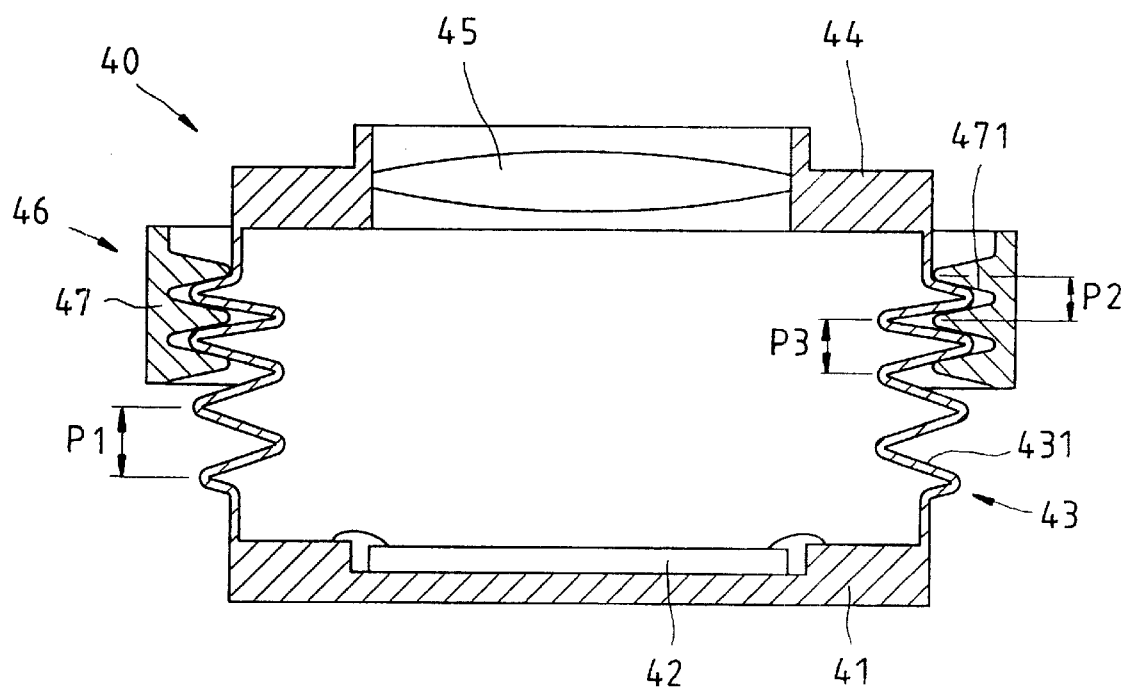
FIG. 7 shows a sectional view of a fourth preferred embodiment of the present invention.

As shown in FIG. 7, a lens module 40 of the fourth preferred embodiment of the present invention is mounted on a circuit board 41 which is provided thereon with an imaging chip 42. The lens module 40 comprises an expandable tube 43, a seat body 44, a lens 45, and a fixation member 46. The difference between the fourth and the preceding embodiments is described hereinafter.

The fixation member 46 is a frame body 47 which is disposed outside the expandable tube 43 and is provided in the inner wall with a pleated segment 471 corresponding in profile to the serpentine segment 431 of the expandable tube 43. The pleated segment 471 has a pitch P1 which is different from the pitch P2 of the serpentine segment 431. As the frame body 47 is turned to move up and down, the serpentine segment 431 is so forced by the frame body 47 that the serpentine segment 431 is confined by the pleated segment 471, thereby resulting in a slight change in height. The focus adjustment is thus attained. The pleated segment 471 has a pitch P1 which is smaller than the pitch P2 of the serpentine segment 431. When the frame body 43 is turned, the pleated segment 471 puts a pressure on the serpentine segment 431, thereby causing its original pitch P2 to change to a pitch P3 which is reversible to P2 upon being relieved of the pressure. The adjustment of focus between the lens 45 and the chip 42 is thus attained.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following claims.

What is claimed is:

1. A lens module for use in covering a board body which is provided with an imaging chip, said lens module comprising:
   a seat body;
   at least one lens fixed in said seat body for passage of rays of light from the outside of said seat body so as to form an image on the chip;
   an expandable tube having a serpentine segment, said expandable tube being sandwiched between said seat body and said board body, thereby forming a closed passage between said lens and said chip;
   a fixation member attached to said serpentine segment of said expandable tube for limiting deformation of said serpentine segment of said expandable tube.

2. The lens module as defined in claim 1, wherein said fixation member is a lashing ring adjustable in an inner diameter thereof to press or release said serpentine segment, thereby resulting in a change in height of said serpentine segment.

3. The lens module as defined in claim 1, wherein said fixation member is a closed plastic body which is made of a thermosetting moldable material and is intended to fix the height of said serpentine segment upon completion of an adjustment of focus between said lens and said chip.

4. The lens module as defined in claim 1, wherein said expandable tube is provided with an outer threaded segment contiguous to said serpentine segment; wherein said fixation member is a nut which is engaged with said outer threaded segment of said expandable tube such that said nut is turned to move up and down along said outer threaded segment of said expandable tube so as to put a pressure on said serpentine segment, thereby resulting in a change in height of said serpentine segment of said expandable tube.

5. The lens module as defined in claim 4, wherein said outer threaded segment is located in an upper segment which is located in proximity of said serpentine segment.

6. The lens module as defined in claim 4, wherein said outer threaded segment is located in a lower segment which is located in proximity of said serpentine segment.

7. The lens module as defined in claim 1, wherein said fixation member is a frame body which is disposed in the outside of said expandable tube, said frame body having a pleated segment which is different in pitch from said serpentine segment and is intended to confine and change height of said serpentine segment.

8. The lens module as defined in claim 1, wherein said board body is a circuit board.

* * * * *